(12) United States Patent
Jones et al.

(10) Patent No.: US 6,873,279 B2
(45) Date of Patent: Mar. 29, 2005

(54) ADAPTIVE DECISION SLICER

(75) Inventors: Keith R. Jones, Irvine, CA (US); Gilberto Isaac Sada Treviño, Irvine, CA (US); William W. Jones, Aliso Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 10/464,963

(22) Filed: Jun. 18, 2003

(65) Prior Publication Data

US 2004/0257253 A1 Dec. 23, 2004

(51) Int. Cl.[7] ............................................... H03M 1/12
(52) U.S. Cl. ....................................... 341/155; 341/137
(58) Field of Search ................................ 341/137, 155, 341/200, 118, 120

(56) References Cited

U.S. PATENT DOCUMENTS 5,210,712 A * 5/1993 Saito ........................ 708/819
5,963,901 A * 10/1999 Vahatalo et al. ............ 704/233
6,317,062 B1 * 11/2001 Payer et al. .................. 341/56
6,341,360 B1 * 1/2002 Abdelilah et al. .......... 714/704
6,445,662 B1 * 9/2002 Tonami .................... 369/59.21

* cited by examiner

Primary Examiner—Michael Tokar
Assistant Examiner—Linh V Nguyen
(74) Attorney, Agent, or Firm—Weide & Miller, Ltd.

(57) ABSTRACT

A method and apparatus is disclosed for adaptively determining threshold values in a decision device, such as a decision slicer. In one embodiment, a slicer receives one or more updated threshold values during operation to adaptively accommodate changes in the received signal or the channel that may occur over time. The updated threshold value is based on a MIN value and a MAX value. The MIN values represent a value related to a recently received input that was determined to qualify for a particular slicer output and was less than the particular slicer output value. The MAX values represent a value related to a recently received input that was determined to qualify for a particular slicer output and was greater than the particular slicer output value. In one embodiment, the MAX and MIN value computation is based on scaling factors that dampen the rate of change of the threshold value.

23 Claims, 10 Drawing Sheets

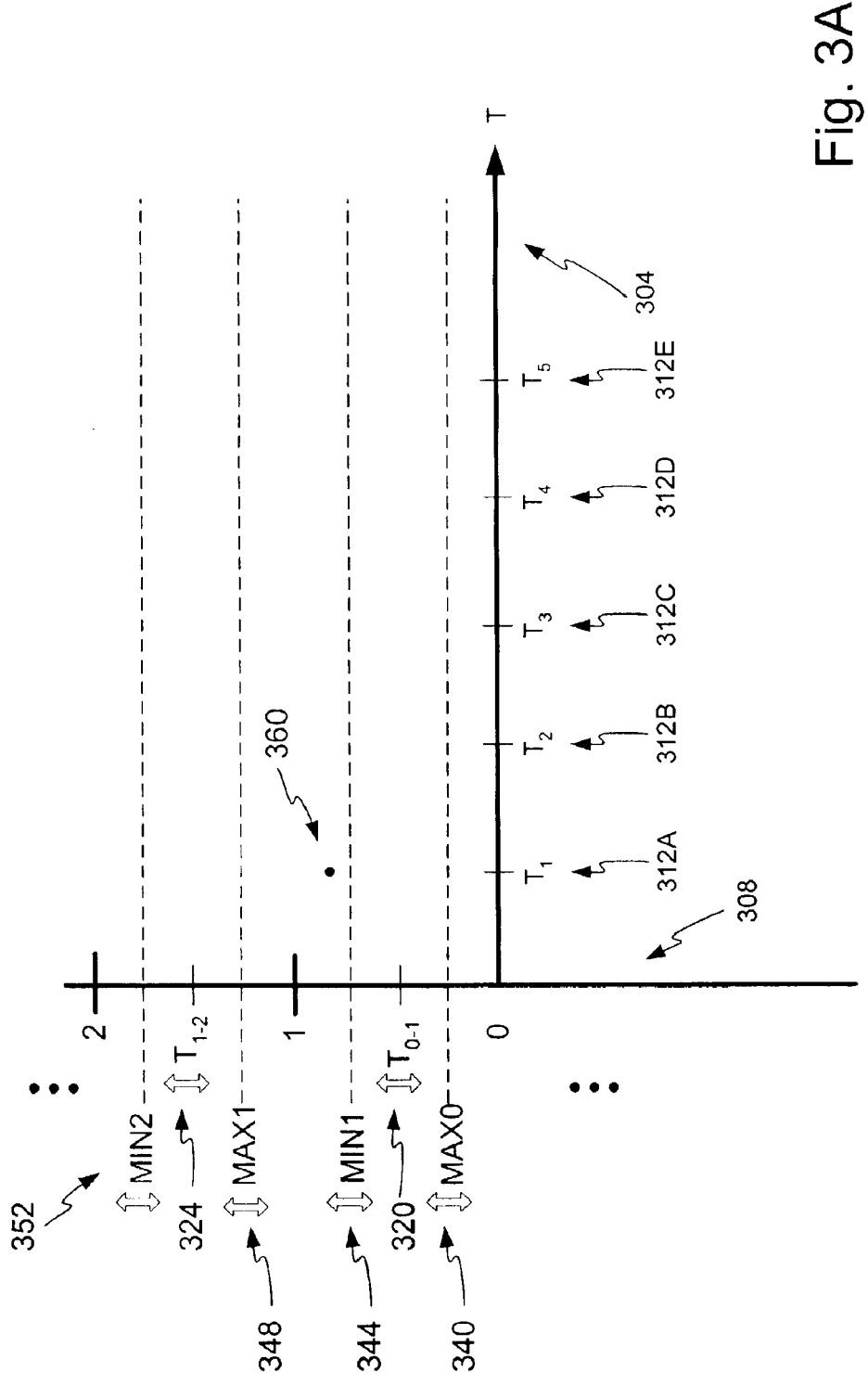

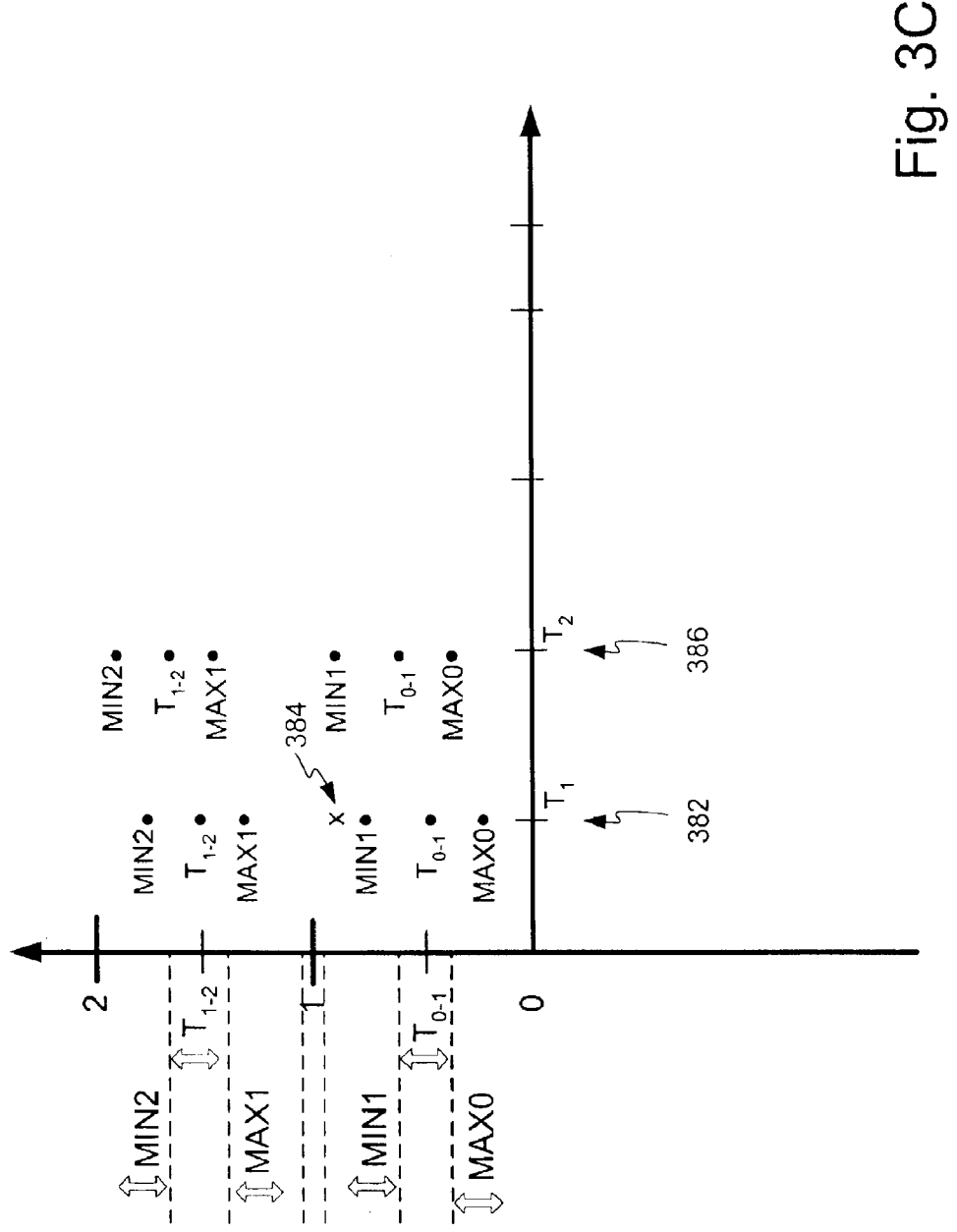

ADAPTIVE DECISION SLICER

FIELD OF THE INVENTION

The invention relates to communication systems and in particular to a method and apparatus for adaptive decision slicing.

RELATED ART

As is commonly understood, transmission of digital data often occurs over a transmission medium, such as a channel or transmission line, in analog form. Prior to transmission, the digital data may be subject to processing and digital to analog conversion. In some instances, the digital data may be modulated to various voltage levels or have different levels of phase offset introduced. For example, in AMI line coding, there are three signal levels: a positive and negative pulse of predetermined voltage values and a zero volt level. Similarly, pulse amplitude modulation maps the digital data into three or more different voltage levels.

Upon receipt, the analog signal, which may assume numerous different voltage levels, is processed and eventually converted back to digital form. As part of the processing, it is often necessary to determine, or at least accurately estimate, the original signal that was the transmitted so that accurate decoding may occur. However, at high data transmit rates and when transmitting the signal over long distances, signal degradation may occur, which in turn makes signal decoding difficult.

One aspect of signal decoding comprises analyzing the received signal at a particular point in time, often referred to as a sampling point, to determine what signal level was transmitted by the transmitter. This process is often referred to as a decision process or slicing. A decision slicer is an apparatus that maps the received equalized signal back into logical values corresponding to the logical values in which the signal was transmitted. The slicer performs this task by comparing the equalized signal with fixed decision boundaries. If the fixed decision boundaries are not set correctly, an inaccurate decision may occur.

In practice, this process presents numerous challenges, which systems of the prior art are not well adapted to overcome. One challenge arises as a result of the signal passing through a channel. As the signal passes through a channel, intersymbol interference may occur. As a result, comparison of the incoming signal, at the sampling times, to the decision boundaries of the decision device may yield incorrect decisions. Hence, the signal output from the decision device is different than the transmitted signal.

Another challenge results from noise introduced into the signal during transmission. The noise may affect the amplitude of the received signal, such as by shifting the signal magnitude upward or downward. During the decision process, this shift may undesirably result in an inaccurate decision. It is contemplated that the noise may change over time and is often unknown thereby further compounding the potential error rate.

One proposed solution has been to utilize gain control to drive the peak signal value to a target value. This proposed solution suffers from at least one drawback in that it only controls the peak of the received signal and as a result, noise variation about zero is never observed or compensated. Hence, if the signal variation about zero is different than about the individual pulse levels, then the decision boundary will not be set at an optimal level. The effects of input clock jitter are particularly troublesome since this type of jitter affects a zero value differently than a pulse value.

The method and apparatus described herein provides accurate signal decisions while overcoming the drawbacks of the prior art.

SUMMARY

To over come the drawbacks of the prior art the method and apparatus disclosed herein calculates decision thresholds in a decision device based on one or more comparisons between prior received signals, prior threshold values, an average of these signals, or any combination thereof As a result of dynamically calculating the decision thresholds, the thresholds of the decision device adapt to or track changes in the signal that occur over time. Consequently, more accurate decision device operation is enabled.

In one embodiment, a system is provided for calculating a threshold value in a decision device. In one configuration, the system comprises a MIN value computation module configured to receive an input signal and a decision signal and update a MIN value. The system further comprises a MAX value computation module configured to receive an input signal and a decision signal and update a MAX value. The MIN value and MAX value, which are discussed below in more detail, comprise values or signals that are utilized to calculate decision device threshold values. The system also comprises a threshold computation module configured receive the MIN value and the MAX value and calculate an updated threshold value based on the MIN value and the MAX value.

In one embodiment, the updated threshold value is a value between an updated MIN value and an updated MAX value. It is contemplated that the MIN value computation module may be configured to compare a prior MIN value to the input signal and establish the updated MIN values as either of a modified MIN value or the prior MIN value. The system may further comprise a decision device configured to compare the input signal to one or more threshold values to thereby generate the decision signal. The MIN value may comprise a value related to a prior input which was less than a first decision device output and which was quantized to the first decision device output. The MAX value may comprise a value related to a prior input which was greater than a first decision device output and which was quantized to the first decision output. The system may also further comprise a decision device and for each decision device there exists a corresponding MIN value and a corresponding MAX value.

The apparatus disclosed herein may also comprise a system for adaptively updating one or more threshold values in a decision device that has two or more possible decision value outputs to thereby improve decision device accuracy. One embodiment of such a system includes a decision device configured to receive one or more threshold values and a received signal and generate a decision value based on the received signal's relation to the one or more threshold values. The system also includes a MIN value tracking module configured to generate a MIN value wherein the MIN value is based on at least one prior received signal and a MAX value tracking module configured to generate a MAX value, wherein the MAX value is based on at least one prior received signal. Also included are a MIN value tracking module and a MAX value tracking module, which generate and modify MIN and MAX values and which are discussed below in more detail.

The system also includes a threshold computation module configured to receive the MAX value and the MIN value and calculate one or more threshold values based on the MAX value and the MIN value.

In various embodiments, the decision device may comprise a slicer in a communication receiver. In one embodiment, the one or more threshold values comprise a value between the MIN value and the MAX value and each of the one or more threshold values has an associated MIN value and MAX value. It is further contemplated that the received signal may comprise a transmitted signal and a noise component that changes over time and the MIN value and the MAX value adapt to the noise component as it changes over time to thereby change the one or more threshold values. In one embodiment, the MIN value is modified by a first scaling factor if the input signal is greater than an associated threshold value and the MAX value is modified by a second scaling factor if the input signal is less than an associated threshold value.

Also disclosed herein is a method for calculating an updated threshold value for use by a decision device that is configured to quantize an input signal to one of two or more decision device output values. This method comprises the steps of receiving an input signal at a decision device, at a MIN value computation module, and at a MAX value computation module. Thereafter, generating an updated MIN value by scaling the input signal to create a first updated MIN value, scaling a prior MIN value to create a second updated MIN value, and comparing the input signal to an existing MIN value to generate a first control signal. The first control signal may be provided to a first selector configured to output either of the first updated MIN value or the second updated MIN value. The method then provides the output of the first selector as an input to a second selector and provides the existing MIN value as an input to the second selector. Next, the method also provides a second control signal to the second selector such that the second control signal causes the second selector to output either of the output of the first selector or the existing MIN value as an updated MIN value.

The method also generates an updated MAX value by scaling the input signal to create a first updated MAX value, scaling an existing MAX value to create a second updated MAX value, and comparing the input signal to an existing MAX value to generate a third control signal. The third control signal is provided to a third selector configured to output e either of the first updated MAX value or the second updated MAX value. The method also provides the output of the third selector as an input to a fourth selector and provides the existing MAX value as an input to the fourth selector. The method then provides a fourth control signal to the fourth selector such that the fourth control signal causes the fourth selector to output either of the output of the third selector or the existing MAX value as an updated MAX value. The method then processes the updated MAX value and the updated M IN value to create an updated threshold value and provides the updated threshold value to the decision device.

In one embodiment, the step of scaling the input signal to create a first updated MIN value comprises increasing the value of the signal. It is contemplated that the second control signal may be based on a prior decision value. Furthermore, a MIN value and a MAX value may be associated with each of the two or more decision device output values.

In another method of operation, a method for calculating a decision threshold value is disclosed wherein the decision threshold value comprises a value between decision device output values. This method comprises comparing an input to a decision threshold value and updating a MAX value to create an updated MAX value if the comparing determines that the input is greater than the threshold. The process of updating the MAX value comprises scaling the input to create a scaled input and scaling the MAX value to create a scaled MAX value. After the scaling, the system may output the scaled input or the scaled MAX value based on a comparison between the input and the MAX value. The method further comprises updating a MIN value to create an updated MIN value if the comparing determines that the input is less than the threshold. The process of updating the MIN value comprises scaling the input to create a scaled input and scaling the MIN value to create a scaled MIN value, and then outputting the scaled input or the scaled MIN value based on a comparison between the scaled input and the scaled MIN value. As a result, the method generates a decision threshold value based on the updated MIN value and the updated MAX value.

In one variation, the input comprises an analog signal received over a communication channel. In another variation, the MIN value and a MAX value are associated with each decision threshold value. The process of scaling the input and scaling the MIN value may comprise adjusting the input and the MIN value based on one or more scaling factors.

In another method of operation, a method for quantizing a signal to two or more discrete values based on one or more threshold values is provided. This method comprises receiving a signal at a first time, comparing the signal received at a first time to one or more threshold values, and outputting a first discrete value responsive to the comparing. Thereafter of concurrently, processing the signal received at a first time to generate one or more threshold calculation values and modifying at least one of the one or more threshold calculation values based on the processing to create one or more updated threshold values. At a second time, the operation receives a signal and compares the signal received at the second time to the one or more updated threshold values. Thereafter, the method outputs a second discrete value responsive to the results of the comparison between the signal received at a second time.

In one embodiment, the one or more threshold calculation values are based on signals received prior to the first time and quantized to the first discrete value. In one embodiment, the signal comprises an alternate mark inversion signal received over a communication channel. It is contemplated that the one or more threshold calculation values comprise a MIN value and a MAX value.

It is also contemplated that the step of modifying may comprise increasing or decreasing at least one of the one or more threshold values to thereby cause the threshold value to track the signal. Further, the one or more threshold values may comprise a value between a MIN value and a MAX value associated with each of the one or more threshold values.

It is also contemplated that the method and apparatus disclosed therein may be embodied as a computer program product comprising a computer useable medium having computer program logic recorded thereon for calculating a decision device threshold value. Such an embodiment may comprise computer program code logic configured to compare a signal sample to a prior signal sample and computer program code logic configured to increase a first value if the comparing determines that the signal sample is greater than the prior signal sample. This embodiment would further comprise computer program code logic configured to decrease the first value if the comparing determines that the signal sample is less than the prior signal sample, and computer program code logic configured to establish the decision device threshold value based at least in part on the first value.

In addition, the first value may comprise a MIN value. The computer program code logic may further comprise computer program code logic configured to increase a second value if the comparing determines that the signal sample is less than the prior signal sample and computer program code logic configured to decrease the second value if the comparing determines that the signal sample is less than the prior Is signal sample such that the decision device threshold value is between the first value and the second value. In another embodiment, the first value comprises a minimum signal level associated with the decision device threshold value and the second value comprises a maximum signal level associated with the decision device threshold value. The step of establishing the decision device threshold value based at least in part on the first value may comprise increasing or decreasing the decision device threshold value to track a signal associated with the signal samples.

Other systems, methods, features and advantages of the invention will be or will become apparent to one with skill in the art upon examination of the following figures and detailed description. It is intended that all such additional systems, methods, features and advantages included within this description be within the scope of the invention and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 3A, 3B, and 3C illustrate a plot showing exemplary MIN and MAX values in relation to threshold values.

DETAILED DESCRIPTION

Figure 1:
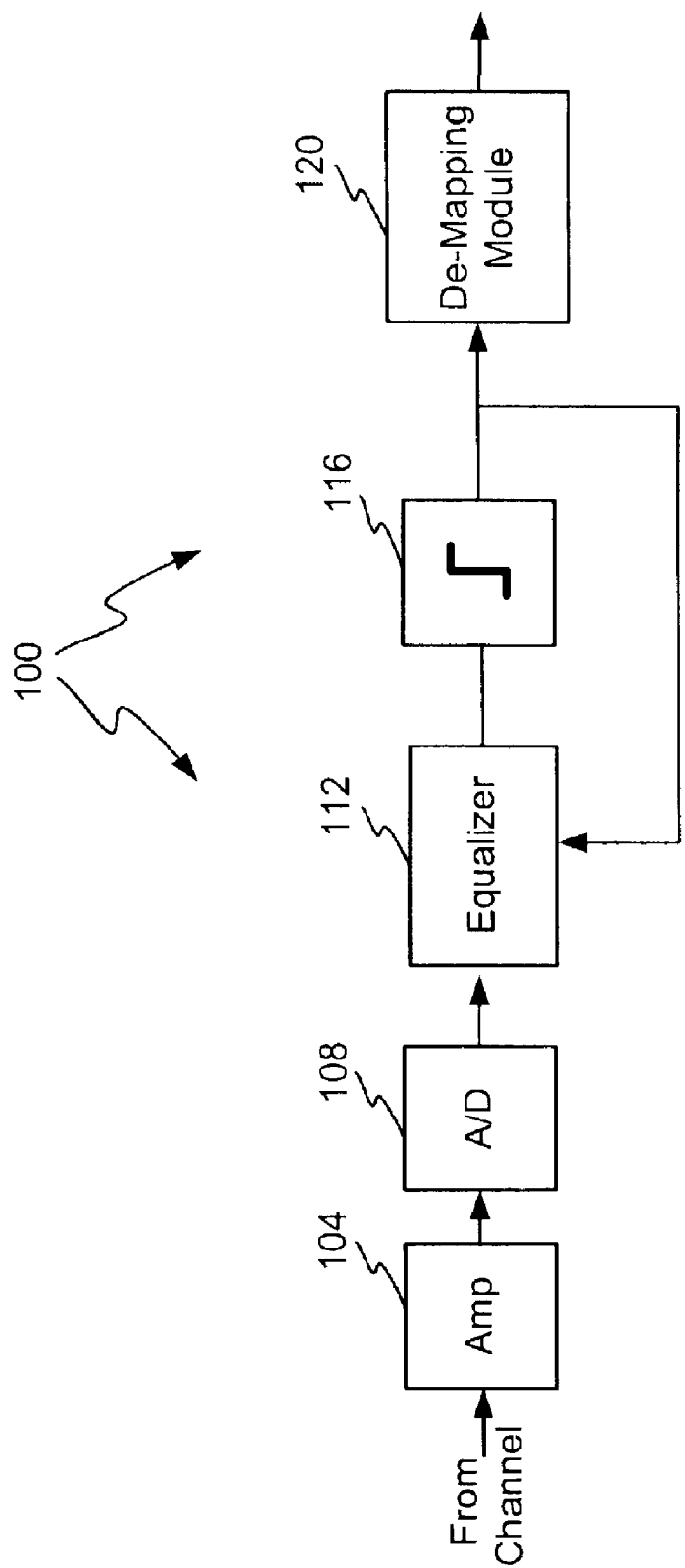
FIG. 1 illustrates a block diagram of an example environment for the invention.

FIG. 1 illustrates an example environment for one embodiment of the invention. This example environment is provided for purposes of discussion and understanding. The invention should not be considered to be limited to this particular environment or field of use. As shown, a receiver 100 comprises an amplifier 104 configured to receive an input from a channel. The amplifier 104 increases the signal magnitude, which may have been attenuated by the channel. The output of the amplifier feeds into an analog to digital converter (A/D) 108, which operates in a manner known in the art. The output of the A/D 108 may connect to an equalizer 112 that is configured to counter the effects of transmission through the channel. The equalizer may comprise any form of feed-forward equalizer, a decision feedback equalizer or any type or number of equalizers or devices configured to compensate for the effects of the channel.

The output of the equalizer 112 connects to a slicer 116. The slicer 116 operates in a manner described below to quantize an input to one of two or more predetermined values. As discussed below in more detail, the slicer 116 may benefit from the method and apparatus discussed herein. The output of the slicer 116 may optionally be provided as feedback to the equalizer 112 and to a de-mapping module 120 to reverse the effect of mapping, modulation, or other signal encoding, if signal encoding was utilized. The output of the demapping module 120 may comprise a digital signal. Additional signal processing may occur as would be understood by one of ordinary skill in the art.

Figure 2:
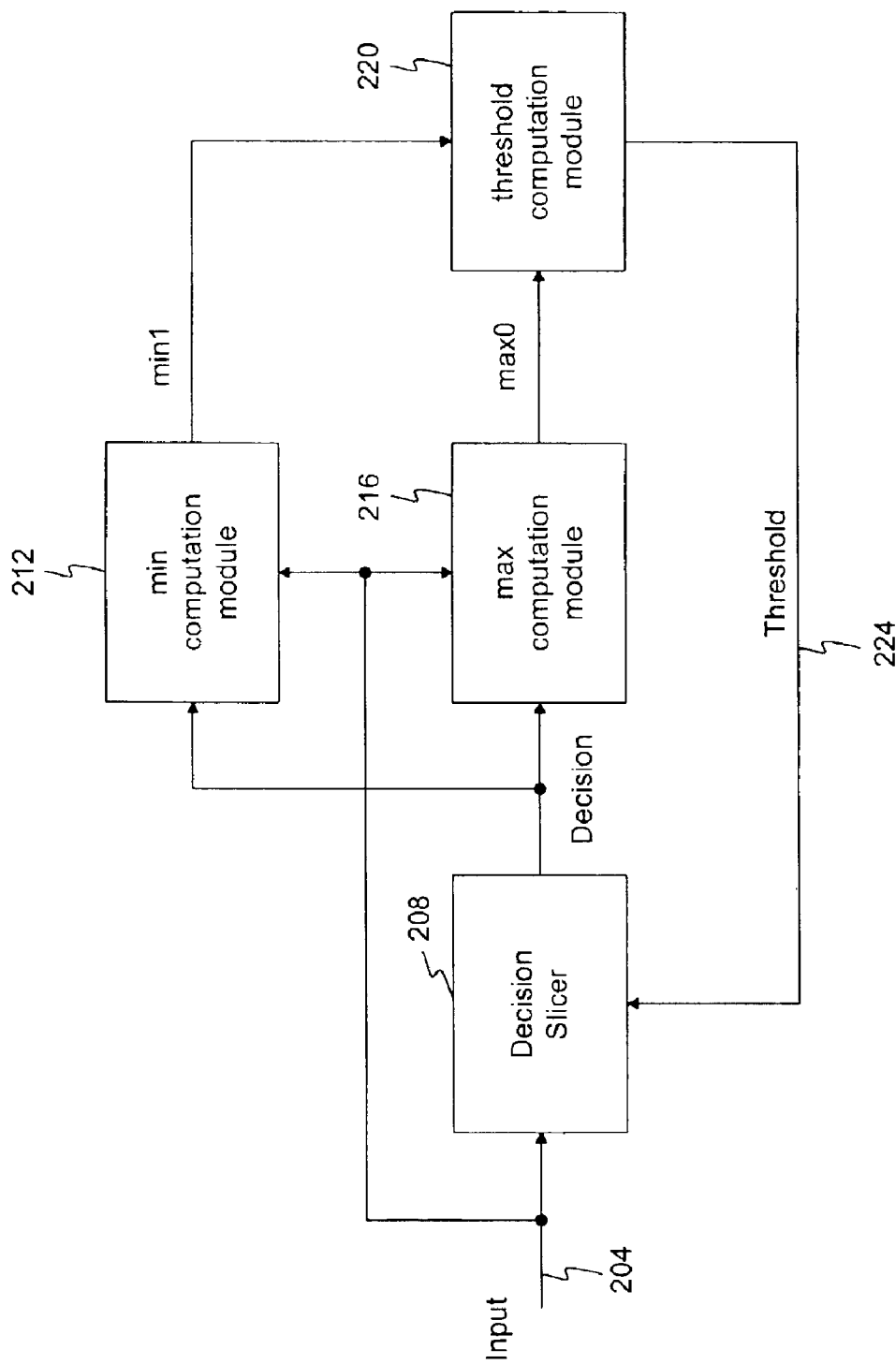
FIG. 2 illustrates a block diagram of an example embodiment of an adaptive decision slicer.

FIG. 2 illustrates a block diagram of an example embodiment of the invention. To overcome the drawbacks of the prior art and provided functionality herebefore not available, an adaptive decision slicer is provided. As shown, an input 204 connects to a decision slicer 208, a MIN value computation module 212 and a MAX value computation module 216. The output of the decision slicer 208 connects to both of the MIN computation module 212 and the MAX computation module 216. The term module is defined to mean hardware, software, or a combination of both.

The decision slicer 208 comprises a configuration of hardware, software, or both designed to receive an input and quantize the input into one or more discrete values. The terms quantize is defined to mean the operation of limiting the possible values of an input to a discrete set of values. One or more of these discrete set of values may be output from the slicer 208.

In one embodiment, the input comprises an analog signal, representative of a discrete value, received over a channel, such as a transmission line. It is contemplated is that the signal may have been distorted. The decision slicer 208 operates to analyze a signal, often through a comparison process, and output a distinct value depending on the characteristics of the input signal. Basic decision slicer operation is known in the art and accordingly not discussed in great detail herein beyond the novel aspects of the invention. The decision slicer 208 may be configured to operate on any type signal comprising, but not limited to, a standard digital signal, an alternate mark inversion encoded signal, a pulse amplitude modulated signal, or any other type of signal that may be contemplated by one of ordinary skill in the art.

In general, the MIN values computation module 212 and the MAX value computation module 216 comprise hardware, software, or a combination of both configured to compare the incoming signal arriving on input 204 with the decision from the decision slicer 208. Based on the comparison, the MIN value computation module 212 and the MAX value computation module 216 may optionally output an adjusted MIN and MAX values to a threshold computation module 220. The MIN and MAX values comprise values that relate to the minimum and maximum values, corresponding to a particular threshold, of the received signal. In a system having multiple thresholds, there may exist a MIN value and a MAX value associated with at least each threshold.

The MIN and MAX values are used to calculate the threshold, and thus, modification of the MIN and MAX values may alter the threshold value. The threshold computation module 220 comprises hardware, software, or both configured to generate a threshold value for use by the decision slicer. In general, the threshold value comprises a value or signal level against which the incoming signal is compared during the decision slicing process. A system may have multiple threshold values. A feedback loop 224 connects the threshold computation module 220 to the decision slicer 208 so that the decision slicer may obtain updated threshold values during operation.

In operation, a signal arrives over input 208 and is provided to the decision slicer 208, the MIN value computation module 212, and the MAX value computation module 216. The decision slicer 208 compares the received signal to one or more threshold values and outputs a decision value to the MIN computation module 212 and the MAX computation module 216. The decision value may also be provided to other aspects of the receiver system so that the received signal may be processed. The MIN computation module 212 and the MAX computation module 216 compare the received signal to the decision or the MIN value and the MAX value or both. The MIN computation module 212 and the MAX computation module 216 may modify the MIN value and the MAX value as is discussed below in more detail. The modified MIN value and MAX value are provided to the threshold computation module 220, which utilizes the MIN and MAX values to modify, if appropriate or necessary, the threshold value. The updated threshold value is provided as feedback to the decision slicer 208 for use in future operation of the decision slicer. Operation continues in this manner.

As an advantage of the embodiment shown in FIG. 2, each of the slicer's threshold values are updated, either in real time or periodically, during reception of the signal. In this manner, the slicer dynamically adapts to changing channel or signal characteristics. Stated another way, the slicer thresholds track the incoming signal to thereby provide a more accurate decision process.

To aid in understanding and fully described the advantages of the method and apparatus described herein, FIG. 3A illustrates exemplary signal values at sample points on a coordinate system showing exemplary MIN and MAX designations. A horizontal axis 304 represents time while a vertical axis 308 represents sample point magnitude. Sampling points 312A–312E are shown at time $T_1$–$T_5$. As shown magnitudes zero, one, and two are shown on the vertical axis. Also shown is a threshold $T_{0-1}$ 320 between the zero and one value and a threshold $T_{1-2}$ 324 between magnitudes 1 and 2 (the one and two values). These threshold values determine the break point, as understood by an exemplary slicer at which input values above the threshold are quantized to the upper value while input values below the threshold are quantized to the lower value. For example, input to the slicer that is greater than $T_{0-1}$ 320 but less than $T_{2-1}$ 324 would be quantized, by a decision device, to a value of one.

Also shown are exemplary MIN and MAX values. A MAX0 variable 340 represents a value located between $T_{0-1}$ 320 and the zero value. The MAX0 variable 340 represents a value that relates to a prior received signal value, that was greater than zero and that was quantized by the decision slicer to be a zero value. A MIN1 variable 344 represents a value located between $T_{0-1}$ 320 and the one value. The MIN1 variable 344 represents a value that relates to a prior received signal value that was less than one but was quantized by the decision slicer to be a one value. A MAX1 variable 348 represents a value located between the one value and $T_{1-2}$. The MAX1 variable 348 represents a value that relates to a prior received signal value that was greater than one, but was quantized by the decision slicer to be a one value. A MIN2 variable 352 represents a value located between $T_{1-2}$ 324 and the two value. The MIN2 variable 352 represents a value that relates to a prior received signal value that was less than two, but was quantized by the decision slicer to be a two value.

In general, the MIN values and MAX values may be represented as MIN-N value and the MAX-M values, where N and M represent positive whole numbers. The MIN-N value and the MAX-M values are configured to change over time based on the prior received input signals and existing MIN-N and MAX-M values. In this manner, changes in the input signal that occur over time may be accounted for, and the threshold value, which is dependent upon the MIN and MAX values, may be dynamically modified to adapt to changes in the input signal.

As would be understood by one of ordinary skill in the art, certain mapping, coding, or modulation schemes utilize numerous decision levels to which a received signal may be quantized. Accordingly, it is contemplated that the principles disclosed herein may be extended to any number of threshold levels and MIN values and MAX values. Thus, a system may comprise numerous MIN and MAX computation modules or a system may enable a single configuration as shown in FIG. 2 to determine and store the numerous threshold values and the MIN values and MAX values associated with numerous possible decision levels.

By way of example and in reference to FIG. 3A, at a time $T_1$ a signal having magnitude shown by point 360 may be presented to the slicer. Since the point 360 is between $T_{1-2}$ and $T_{0-1}$, the slicer declares, i.e. quantizes, the point 360 as a one value. Operation of the threshold adjustment module 220, MIN computation module 212, and MAX computation module 216 (shown in FIG. 2) may adjust the values of $T_{1-2}$ and $T_{0-1}$ during operation to thereby control the threshold levels.

Figure 3B:
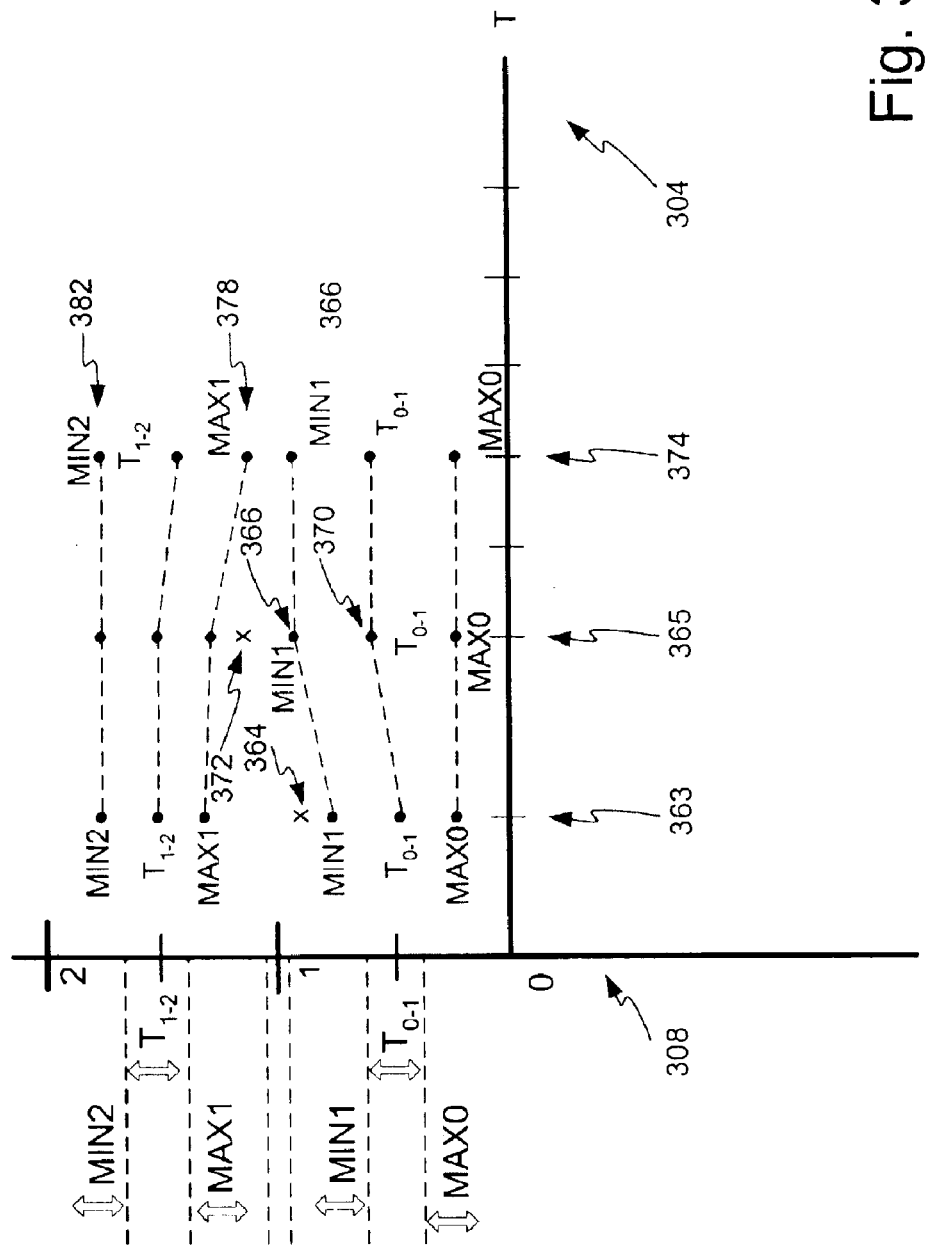

FIG. 3B illustrates plots of an exemplary MIN value, MAX value, and threshold values over time. It is contemplated that the MIN and MAX values will increase and decrease dynamically depending on the value of the received signal. At time $T_1$, 363, the MIN and MAX values are set as shown for each of the threshold values or slicer output levels. During device startup, these values may assume a default value. Also shown are the threshold levels for $T_{0-1}$ and $T_{1-2}$. At time $T_1$, a signal shown by sampling point 364 is received. This is repeated by an X364 on the graph. Based on the existing values of MIN1 and MAX1 at a time $T_1$ the slicer would quantize the input 364 to a value of one.

Since the received input 364 was larger than the MIN1 value at a time $T_1$, at a time $T_2$ 365, the MIN1 value 366 is shifted upward, i.e. increased, to account for the sampling point 364 being larger than the MIN1 sampling point. Any level of adjustment is contemplated. In one embodiment, a limit on the amount of change to a threshold value is incorporated into the system. Calculation of the MIN1 value is discussed below in more detail.

Since in this embodiment the threshold values are based on associated MIN and MAX values, the threshold value $T_{0-1}$ 370 would also be increased. These changes cause future samples to be subject to decision processing based on threshold values, such as threshold value $T_{0-1}$ 370, that reflect the changing conditions of the signal or the channel.

Figure 8:
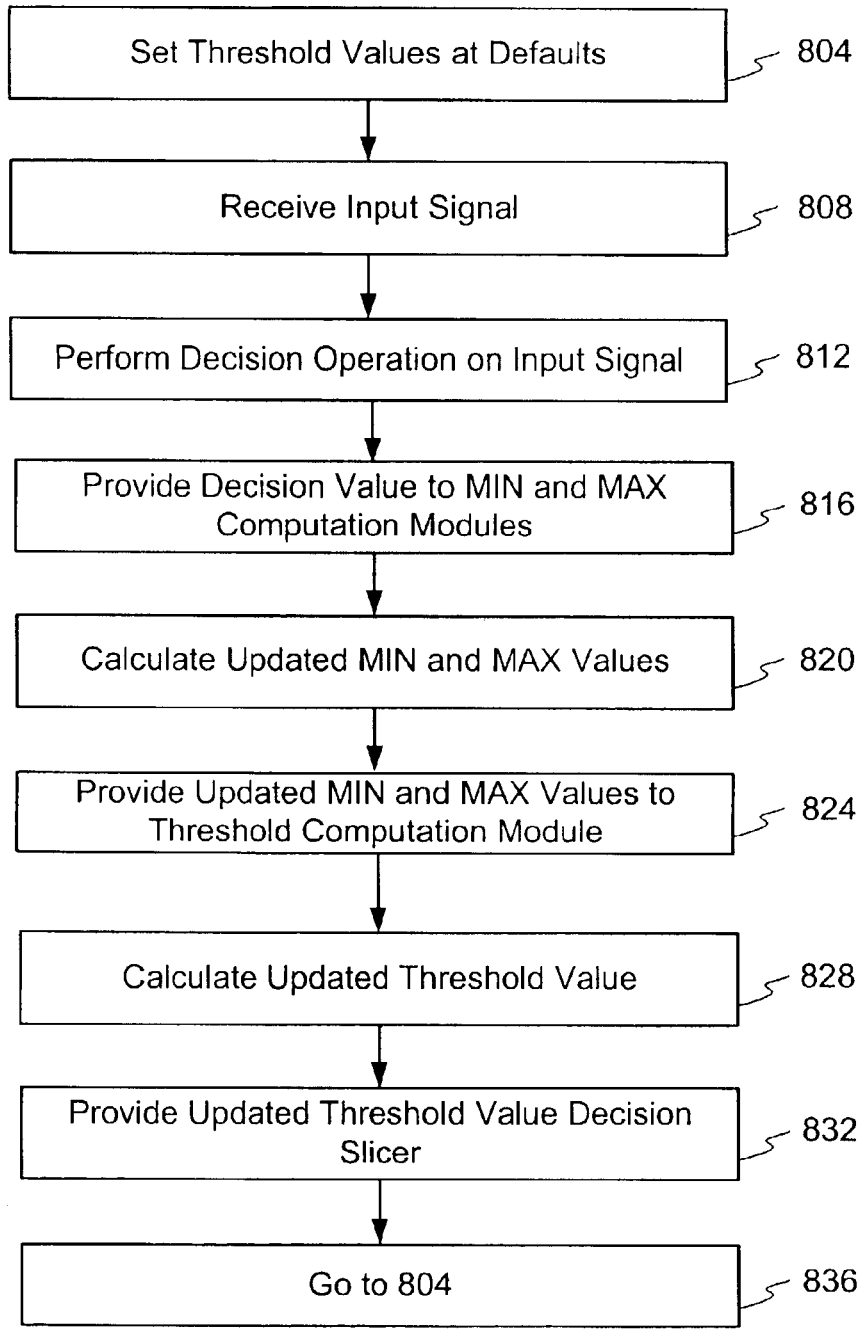
FIG. 8 illustrates an operational flow diagram of an example method of operation.

Also occurring at a time $T_2$ 365, the system receives input 372. At or before time $T_3$ 374, the system adjusts the value of MAX1 to account for the input 327 by reducing the value of the MAX1 value 378. Reducing MAX1 value 378 results in the threshold value $T_{1-2}$ 380 to also be reduced, since the threshold value $T_{1-2}$ 380 is based on the MAX1 values 378 and the MIN2 value 382. In one embodiment, $T_{1-2}$ equals the average of MAX1 and MIN2. Other threshold values may be calculated in a similar manner. Operation would continue in this manner. FIG. 8 presents additional discussion regarding an example method of operation.

Although only a single MAX or MIN value is changing during each sampling time or decision operation, it is contemplated that any number or all of the MAX and MIN values, and hence the threshold values, may change during a sampling time or decision operation. For example, in one embodiment shown in FIG. 3C, all of the threshold values may be modified in response to an input. As shown in FIG. 3C, at a time $T_1$ 382, the MAX, MIN and threshold values are set as shown and an input 384 is received. The input 384 is processed as described herein. To account for the input 384 being larger than the MIN1 value, the system may increase all of the threshold values, as shown at a time $T_2$ 386.

Figure 4:
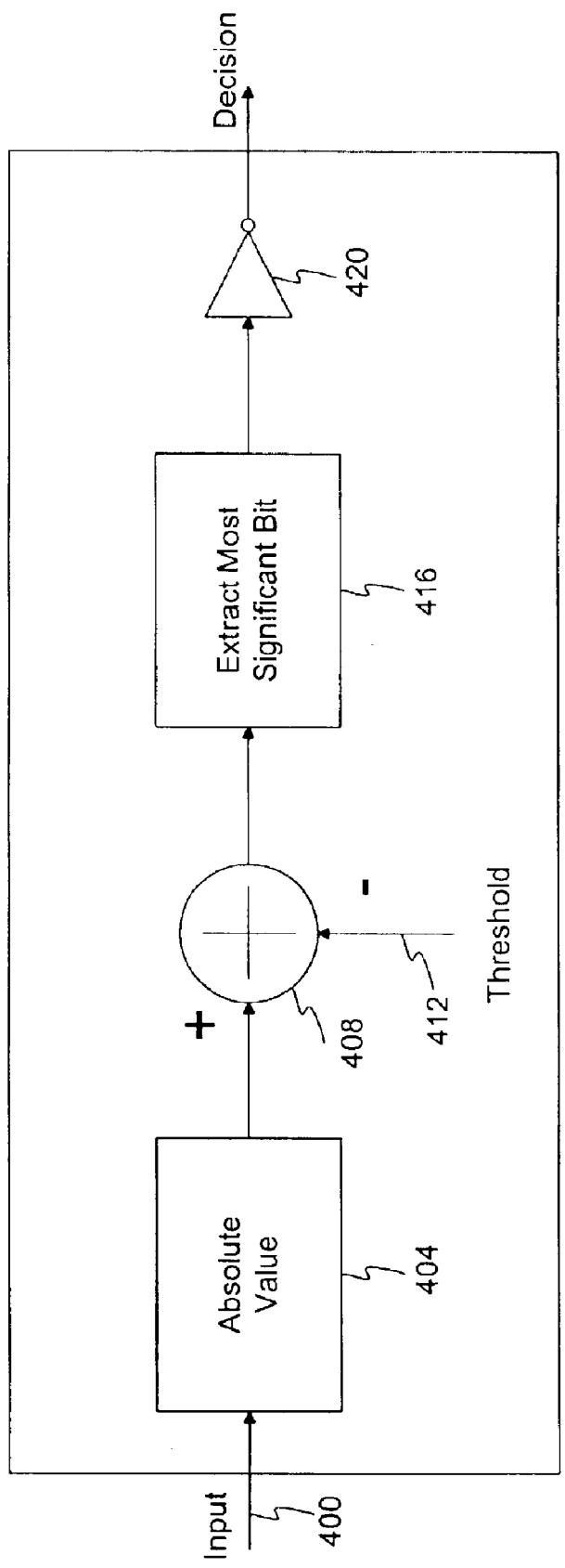
FIG. 4 illustrates a block diagram of an example embodiment of a decision slicer.

In reference to FIG. 4, a block diagram of an example embodiment of a decision slicer is shown. The input 400 connects to an absolute value module 404, the output of which connects to a summing junction 408. The summing junction 408 also receives the threshold value as an input 412. In one embodiment the summing junction is configured to subtract the threshold value from the absolute value of the input. The threshold value may be received as a feedback signal from a threshold computation module (not shown in FIG. 4).

The output of the summing junction 408 feeds into a processing module 416 configured to extract the most significant bit from a received signal. The module 416 may comprise any configuration of hardware or software configured to extract one or more most significant bits. The output of the processing module 416 feeds into an inverter 420. As is understood the inverter negates or reverses the logic value of its input. The output of the inverter 420 may comprise the decision of the decision device.

Figure 5:
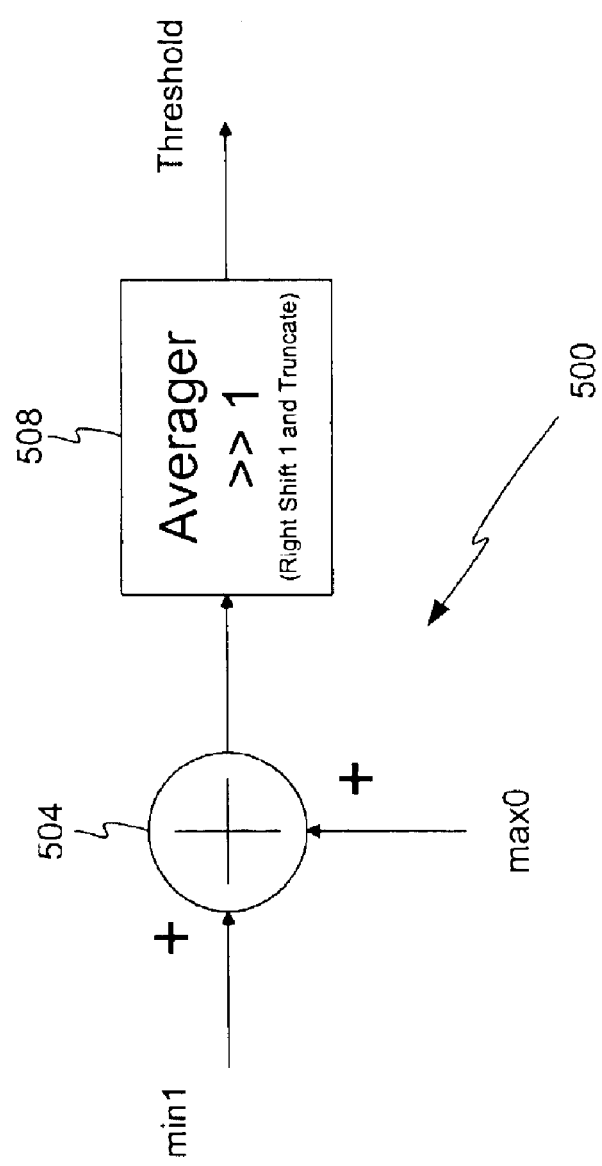
FIG. 5 illustrates a block diagram of an example embodiment of a threshold computation module.

Turning to FIG. 5, a block diagram of a threshold adjustment module is shown. As with all figures shown herein, this is but one possible example embodiment, and it is contemplated that many other embodiments may be enabled without departing from scope of the invention. In this embodiment, the threshold computation module 500 may comprise any device capable of performing an averaging function. In one embodiment, this comprises a summing junction 504 configured to receive the MIN value and the MAX value during an iteration. A summation of these values is provided to an averaging device 508 configured to average these values. In one embodiment, the averaging device 508 comprises a device configured to right shift the decimal by one and truncate the remainder. The output of the averaging device 508 comprises the threshold value. As can be seen, the threshold is dependent upon the MIN and MAX values.

Figure 6:
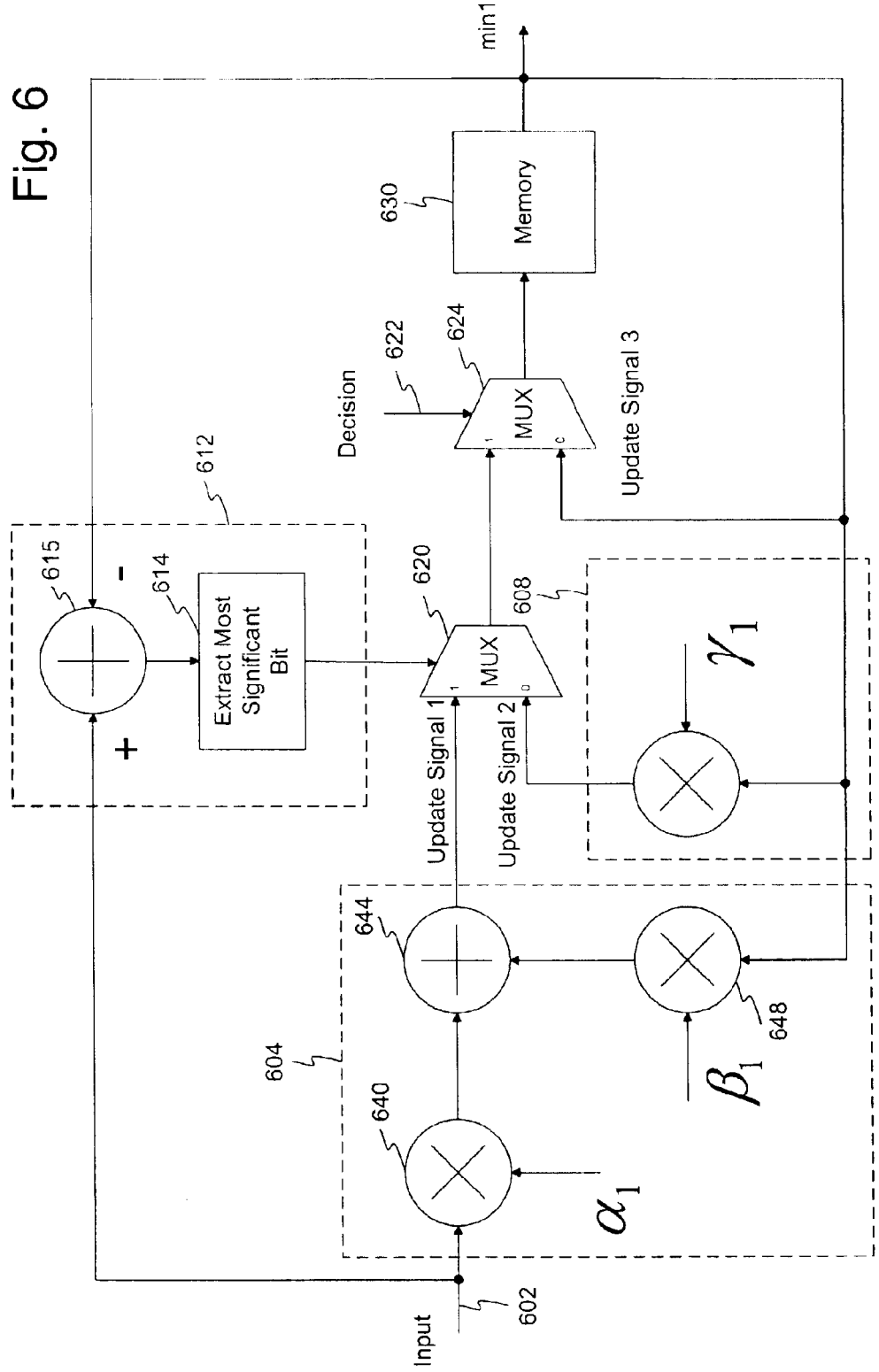
FIG. 6 illustrates a block diagram of an example embodiment of a MIN value computation module.

FIG. 6 illustrates a block diagram of an example embodiment of a MIN computation module. In general, the MIN computation module is configured to establish and modify the MIN value, which is used to compute the threshold, as used by the slicer. For purposes of discussion, the MIN computation block may be divided into a first scaling subsystem 604, a second scaling subsystem 608, and a comparator subsystem 612. Also present are first and second selectors 620, 624 and a memory 630.

As shown, the input 602 connects to the first scaling subsystem 604 and the comparator subsystem 612. The first scaling subsystem 604 comprises a first multiplier 640 connected to the input and configured to receive a scaling factor $\alpha_1$. The output of the first multiplier 640 connects to a summing junction 644 that is configured to also receive the output of a second multiplier 648. The second multiplier receives a scaling factor $\beta_1$ which is multiplied with the feedback from the MIN register 630, discussed below. The summing junction 644 combines the inputs from the multipliers 640, 648 and provides the combined outputs to a selector, such as multiplexer 620.

The second scaling subsystem 608 comprises a multiplier configured to scale by a factor of $\gamma_1$ and the MIN values as fed back from the memory 630. The scaled MIN value is provided to the first selector 620 as an input.

The comparator subsystem 612, as discussed above, connects to the input 602 and is further configured to receive the MIN value from the MIN register 630. In the example embodiment shown in FIG. 6, a summing junction 615 subtracts the MIN value from the input and provides the result to a processing unit 614 configured to extract the most significant bit. The most significant bit value is provided as a control signal to the first selector 620.

The first selector 626 may comprise any type switch, control logic, memory device, multiplexer or the like configured to selectively output any of two or more inputs. Either of the two inputs to the first selector 620 are selectively provided as an input to a second selector 624. The second selector 620 also receives as an input the MIN value from the memory 630. The decision value input 622, which may be generated as shown in FIG. 4, serves as a control signal for the second selector 624. The output of the second selector 624 comprises the updated MIN value and is provided to the memory 630. The memory 630 may comprises any type of data storage device. In one embodiment, the memory comprises a register configured to store the MIN value.

In operation, the MIN computation module is configured to modify the MIN value based on the previous MIN values, the input signal, and the values of $\alpha_1 \beta_1$, and $\gamma_1$. The MIN value is used to determine the threshold values as used by the decision slicer. The input 602 receive the input signal and presents it to the comparator subsystem 612 and the first scaling subsystem 604. The comparator generates a control signal for use by the first selector 620. In the embodiment shown in FIG. 6, if the input is larger than the MIN value, then the comparator subsystem 612 presents a first control value to the first selector 620. Alternatively, if the input is smaller than the MIN value, then the comparator subsystem 612 presents a second control value to the first selector 620.

The first selector 620 outputs the input from the first scaling system 604 depending on the value of the input in relation to the prior MIN value. The first selector 620 outputs the input from the second scaling system 608 depending on the value of the input in relation to the prior MIN value.

The calculation of the two inputs to the first selector is now discussed. The first scaling subsystem 604 sums a scaled input (based on $\alpha_1$) with a scaled version of the prior MIN value to generate the input to the selector 620. The values of $\alpha_1$, $\beta_1$ may be selected to emphasize either the input or the prior MIN value. In one embodiment, the values of $\alpha_1$, $\beta_1$ are related by the equation $\alpha_1 + \beta_1 = 1$, where both values are greater than zero. Since the output from the first scaling module 604 may be selected depending on the input value in relation to the prior MIN value, then the first scaling subsystem serves to reduce the prior MIN value to account for the reduction in the input. This in turn reduces the threshold, which provides the advantage of the threshold value tracking or being related to the power level or amplitude of the input. Thus, as the input amplitude changes over time, the slicer is dynamically being adapted to the changes in the input.

Conversely, the output of the second scaling subsystem 608 is selected by selector 620 when i t is desired to increase the MIN value in response to the MIN value being larger than the input. Thus, the MIN value is scaled upward by a factor $\gamma_1$ to thereby also increase the threshold. In one embodiment, the value $\gamma_1$ is set at a value slightly greater than one. The value of $\gamma_1$ may be selected to provide a desired amount of dampening such that a large change or difference between the input and the prior MIN value does not drastically change the subsequent MIN value.

The second selector 624 receives either of the first scaling subsystem 604 output or the second scaling subsystem 608 output as one possible input and the prior MIN value as the other possible input. The decision value controls the second selector 624 such that if the decision declares a logical zero, there is no new information from which to base a modification of a new MIN value upon and hence the new MIN value is the prior MIN value. Thus, there would be no change in the MIN value. In an alternative embodiment, the system is configured to gradually increase or decrease the MIN value to a predetermined value if no changes to the MIN value otherwise occur.

Alternatively, if the decision slicer declares a logical one, then the output of the first selector is chosen as the output of the second selector. This in turn modifies the MIN value in the manner discussed above.

Figure 7:
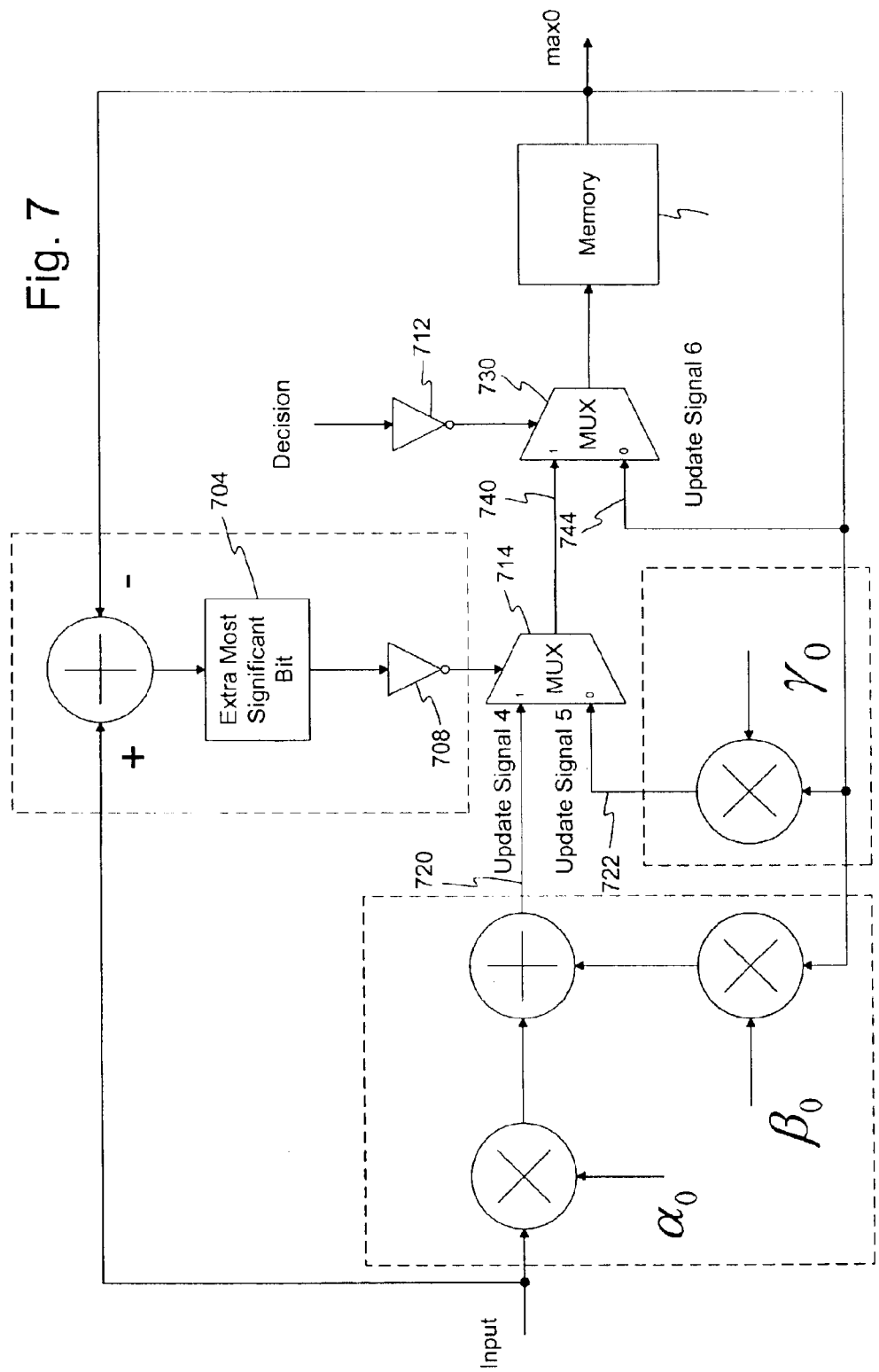
FIG. 7 illustrates a block diagram of an example embodiment of a MAX value computation module.

FIG. 7 illustrates a block diagram of an example embodiment of a MAX value computation module. In this example embodiment, the MAX comparison module is configured similarly to the MIN comparison module shown in FIG. 6. As a result, only the aspects which differ from the MIN comparison module shown in FIG. 6 are discussed. One such difference is that the variables of $\alpha_1$, $\beta_1$ of the MIN computation module are replaced by the variables of $\alpha_0$, $\beta_0$. The $\alpha_0$, $\beta_0$ variables may be set the same as or different than the variables $\alpha_1$, $\beta_1$. In one embodiment, the variables $\alpha_0$, $\beta_0$ are selected such that $\alpha_0+\beta_0=1$ and both $\alpha_0$ and $\beta_0$ are greater than zero. In one embodiment, the values of $\alpha_1$, $\beta_1$ and $\alpha_0$, $\beta_0$ are identical. In one embodiment, the values of $\alpha_1$, $\beta_1$ and $\alpha_0$, $\beta_0$ are generally similar but not identical.

Similarly, the variable of $\gamma_1$ of the MIN computation module is replaced by the variable of $\gamma_0$. The $\gamma_0$ variable may be set the same as or different than the variable $\gamma_1$. In one embodiment, the variables $\gamma_0$ are selected such that it is slightly less than one. In one embodiment, the value $\gamma_0$ is close to one.

Also shown on FIG. 7 is an invertor 708 configured to receive and invert the output of the processing unit 704 and provide the inverted value to the first selector 712 of the MAX computation module. The invertor 708 inverts the output so that, as compared to the operation of the MIN computation module shown in FIG. 6, the first selector 712 outputs the first input 720 depending on the value of the input in relation to the prior MAX value and may output the second input 722 depending on the input value in relation to the prior MAX value. Likewise, a second invertor 712 inverts the decision value prior to providing the decision value to the second selector 730 of the MAX computation module. This results in the second selector 730 outputting the first input 740 or outputting the second input 744. Other aspects of operation are similar to those described above in conjunction with FIG. 6 and as would be understood by one or ordinary skill in the art.

FIG. 8 illustrates an operational flow diagram of an example method of operation. This is but one possible method of operation and it is contemplated that other methods of operation may occur without departing from the scope of the invention and claims that follow. In general, this method performs threshold level modification to account for changing channel conditions and signal characteristics to thereby provide adaptive and hence more accurate decision slicer operation. At a step 804, the system sets the threshold values to a default value. This may occur just prior to start up or during the manufacturing phase. In one embodiment, the default threshold values may be set to a value halfway between the potential outputs of the slicer. Hence, if two potential slicer outputs are 0 and 1, then a default threshold value may be 0.5. At a step 808 the system receives an input signal. Any type input may be provided to the slicer. In one embodiment, the input comprises a signal received from a channel.

At a step 812, the operation performs a decision operation on the input signal. In one embodiment, this may comprise comparing the input signal, at a point in time such as a sampling point, to one or more possible decision slicer values. Decision slicer operation is understood by one of ordinary skill in the art and accordingly not described in detail herein. After the decision process, the operation advances to a step 816 and the slicer provides the decision value to a MIN value computation module and the MAX value computation module. As discussed above, it is contemplated that a slicer may have numerous thresholds that are selected to divide the potential slicer outputs such that an input greater than a threshold is quantized as a first value while an input less than the threshold is quantized to a second value wherein the first value is greater than the second value. For each quantized level there may exist a MAX and MIN value that relates to recent or previous maximum and minimum inputs that were quantized to the corresponding decision output value. During operation, the system monitors and tracks the MAX and MIN values to correspondingly adjust the threshold value.

In both the MIN and MAX computation modules, the MIN value and MAX value may be adjusted. This may occur in the manner described above or any other manner based on the principles disclosed herein. At a step 820, the operation calculates updated MIN and MAX values. In one embodiment, the updated MIN value may be the same as the prior MIN value. Similarly, in one embodiment the updated MAX value may be the same as the prior MAX value. In one embodiment, either of the MIN value or the MAX value are updated but not both.

At a step 824, the updated MIN and MAX values are provided to the threshold computation module so that the system may calculate an updated threshold value at a step 828. As a result, the threshold is dynamically adjusted over time to account for changes in the signal or channel. Stated another way, the threshold(s) are updated to track the signal. At a step 832, the updated threshold is provided to the slicer for use in the subsequent decision operation. It is contemplated that this operation may occur continuously or intermittently to adjust the threshold values.

In one embodiment, there exist multiple thresholds between multiple quantization levels. It is contemplated that a single MIN value and MAX value scaling factor may be created and applied to the multiple MIN values and MAX values that are associated with each slicer quantization level. In one example embodiment, the scaling factor may comprise a value that is added or subtracted to each MIN value and MAX value to thereby adjust every threshold value during an threshold update process. In one embodiment, each MIN value and MAX value of the multiple quantization levels, and hence each threshold, is calculated independently of the other MIN and MAX values, and threshold. At a step 836, the operation returns to step 804, and processing continues in the manner described above. This is but one method of operation, and it is contemplated that one of ordinary skill in the art may enable other methods of operation.

While various embodiments of the invention have been described, it will be apparent to those of ordinary skill in the art that many more embodiments and implementations are possible that are within the scope of this invention.

What is claimd is:

1. A system for calculating a threshold value in a decision device comprising:
    a MIN value computation module configured to receive an input signal and a decision signal and update a MIN value;
    a MAX value computation module configured to receive an input signal and a decision signal and update a MAX value;
    a threshold computation module configured to receive the MIN value and the MAX value and calculate an updated threshold value based on the MIN value and the MAX value,
    wherein the MIN value computation module is configured to compare a prior MIN value to the input signal and establish the updated MIN values as either of a modified MIN value or the prior MIN value.

2. The system of claim 1, wherein the updated threshold value is a value between an updated MIN value and an updated MAX value.

3. The system of claim 1, further comprising a decision device configured to compare the input signal to one or more threshold values to thereby generate the decision signal.

4. A system for calculating a threshold value in a decision device comprising:
    a MIN value computation module configured to receive an input signal and a decision signal and update a MIN value;
    a MAX value computation module configured to receive an input signal and a decision signal and update a MAX value;
    a threshold computation module configured to receive the MIN value and the MAX value and calculate an updated threshold value based on the MIN value and the MAX value,
    wherein the MIN value comprises a value related to a prior input which was less than a first decision device output and which was quantized to the first decision device output and the MAX value comprises a value related to a prior input which was greater than a first decision device output and which was quantized to the first decision output.

5. The system of claim 4, further comprising a decision device such that for each decision device there exists a corresponding MIN value and a corresponding MAX value.

6. A system for adaptively updating one or more threshold values in a decision device having two or more possible decision outputs to thereby improve decision device accuracy, the system comprising:
    a decision device configured to receive one or more threshold values and a received signal and generate a decision value based on the received signal's relation to the one or more threshold values;
    a MIN value tracking module configured to generate a MIN value, the MIN value based on at least one prior received signal;
    a MAX value tracking module configured to generate a MAX value, the MAX value based on at least one prior received signal;
    a threshold computation module configured to receive the MAX value and the MIN value and calculate one or more threshold values based on the MAX value and the MIN value,
    wherein the MIN value is modified by a first scaling factor if the input signal is greater than the threshold value and the MAX value is modified by a second scaling factor if the input signal is less than the threshold value.

7. The system of claim 6, wherein the decision device comprises a slicer in a communication receiver.

8. The system of claim 6, wherein the one or more threshold values comprise a value between the MIN value and the MAX value.

9. The system of claim 8, wherein the each of the one or more threshold value is associated with a MIN value and a MAX value.

10. The system of claim 6, wherein the received signal comprises a transmitted signal and noise component that changes over time and the MIN value and the MAX value adapt to the noise component as it changes over time to thereby change the one or more threshold values.

11. A method for calculating an updated threshold value for use by a decision device that is configured to quantize an input signal to one of two or more decision device output values, the method comprising:
    receiving an input signal at a decision device, a MIN value computation module, and a MAX value computation module;
    generating an updated MIN value by;
        scaling the input signal to create a first updated MIN value;
        scaling a prior MIN value to create a second updated MIN value;
        comparing the input signal to an existing MIN value to generate a first control signal, wherein the first control signal is provided to a first selector configured to output either of the first updated MIN value or the second updated MIN value;
        providing the output of the first selector as an input to a second selector;
        providing the existing MIN value as an input to the second selector;
        providing a second control signal to the second selector, wherein the second control signal causes the second selector to output either of the output of the first selector or the existing MIN value as an updated MIN value;
    generating an updated MAX value by;
        scaling the input signal to create a first updated MAX value;
        scaling an existing MAX value to create a second updated MAX value;
        comparing the input signal to an existing MAX value to generate a third control signal, wherein the third control signal is provided to a third selector configured to output either of the first updated MAX value or the second updated MAX value;

providing the output of the third selector as an input to a fourth selector;

providing the existing MAX value as an input to the fourth selector;

providing a fourth control signal to the fourth selector, wherein the fourth control signal causes the fourth selector to output either of the output of the third selector or the existing MAX value as an updated MAX value;

processing the updated MAX value and the updated MIN value to create an updated threshold value; and providing the updated threshold value to the decision device.

12. The method of claim 11, wherein scaling the input signal to create a first updated MIN value comprises increasing the value of the signal.

13. The method of claim 11, wherein the second control signal is based on a prior decision value.

14. The method of claim 11, wherein there exists a MIN value and a MAX value associated with each the two or more decision device output values.

15. A method for calculating a decision threshold value, the decision threshold value comprising a value between decision device output values comprising:

comparing an input to a decision threshold value;

updating a MAX value to create an updated MAX value if the comparing determines that the input is greater than the threshold, wherein updating the MAX value comprises:
scaling the input to create a scaled input;
scaling the MAX value to create a scaled MAX value;
outputting the scaled input or the scaled MAX value based on a comparison between the input and the MAX value;

updating a MIN value to create an updated MIN value if the comparing determines that the input is less than the threshold, wherein updating the MIN value comprises:
scaling the input to create a scaled input;
scaling the MIN value to create a scaled MIN value;
outputting the scaled input or the scaled MIN value based on a comparison between the scaled input and the scaled MIN value; and generating a decision threshold value based on the updated MIN value and the updated MAX value.

16. The method of claim 15, wherein the input comprises an analog signal received over a communication channel.

17. The method of claim 15, wherein a MIN value and a MAX value is associated with each decision threshold value.

18. The method of claim 15, wherein scaling the input and scaling the MIN value comprises adjusting the input and the MIN value based on one or more scaling factors.

19. A computer program product comprising a computer useable medium having computer program logic recorded thereon for calculating a decision device threshold value comprising:

computer program code logic configured to compare a signal sample to a prior signal sample;

computer program code logic configured to increase a first value if the comparing determines that the signal sample is greater than the prior signal sample;

computer program code logic configured to decrease the first value if the comparing determines that the signal sample is less than the prior signal sample;

computer program code logic configured to establish the decision device threshold value based at least in part on the first value.

20. The computer program code logic of claim 19, wherein the first value comprises a MIN value.

21. The computer program code logic of claim 19, further comprising:

computer program code logic configured to increase a second value if the comparing determines that the signal sample is less than the prior signal sample;

computer program code logic configured to decrease the second value if the comparing determines that the signal sample is less than the prior signal sample; and wherein the decision device threshold value is between the first value and the second value.

22. The computer program code logic of claim 21, wherein the first value comprises a minimum signal level associated with the decision device threshold value and the second value comprises a maximum signal level associated with the decision device threshold value.

23. The computer program code logic of claim 19, wherein establishing the decision device threshold value based at least in part on the first value comprises increasing or decreasing the decision device threshold value to track a signal associated with the signal samples.

* * * * *

UNITED STATES PATENT AND TRADEMARK OFFICE
CERTIFICATE OF CORRECTION

PATENT NO. : 6,873,279 B2
DATED : March 29, 2005
INVENTOR(S) : Keith R. Jones et al.

It is certified that error appears in the above-identified patent and that said Letters Patent is hereby corrected as shown below:

Column 2,
Line 13, delete "thereof" and insert -- thereof. --

Column 3,
Line 45, after the word "output", delete "e"
Line 54, delete "M IN" and insert -- MIN --

Column 5,
Line 13, after the word "prior", delete "Is"

Column 6,
Line 39, after the word "contemplated", delete "is"

Column 7,
Line 45, delete "$T_1$-$T_5$.As" and insert -- $T_1$-$T_5$. As --

Column 10,
Line 25, delete "626" and insert -- 620 --

Signed and Sealed this

Seventh Day of June, 2005

JON W. DUDAS
*Director of the United States Patent and Trademark Office*